(12) United States Patent
Grauman et al.

(10) Patent No.: US 11,610,599 B2
(45) Date of Patent: Mar. 21, 2023

(54) SYSTEMS AND METHODS FOR VISUALLY GUIDED AUDIO SEPARATION

(71) Applicant: Meta Platforms Technologies, LLC, Menlo Park, CA (US)

(72) Inventors: Kristen Lorraine Grauman, Austin, TX (US); Ruohan Gao, Cambridge, MA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 551 days.

(21) Appl. No.: 16/706,467

(22) Filed: Dec. 6, 2019

(65) Prior Publication Data

US 2021/0174817 A1      Jun. 10, 2021

(51) Int. Cl.
*G10L 21/00*      (2013.01)
*G10L 21/028*      (2013.01)
(Continued)

(52) U.S. Cl.
CPC .............. *G10L 21/028* (2013.01); *G06N 3/04* (2013.01); *G06N 3/084* (2013.01); *G06T 7/70* (2017.01); *G10L 25/18* (2013.01); *G10L 25/30* (2013.01); *G10L 25/51* (2013.01); *G10L 25/57* (2013.01); *G06T 2207/10016* (2013.01)

(58) Field of Classification Search
CPC .............. G10L 25/63; G10L 2015/225; G10L 25/03; G10L 25/12; G10L 25/18; G10L 25/21; G10L 25/27; G10L 25/30; G10L 25/51; G10L 25/57; G10L 25/60; G10L 25/54; G10L 25/78; G10L 2025/783; G10L 2025/786; G10L 25/81; G10L 25/84; G10L 25/87; G10L 25/93; G10L 21/06; G10L 21/10; G10L 2021/105; G10L 21/16; G10L 21/18; G10L 2015/226; G10L 2015/227; G10L 2015/228; G10L 2025/937; G06N 20/00; G06N 5/04; G06N 5/02; G06N 3/088; G06N 3/08
See application file for complete search history.

(56) References Cited

U.S. PATENT DOCUMENTS 8,326,042 B2 * 12/2012 Wu ....................... G06F 16/785
                                                              348/700
9,401,153 B2 *  7/2016 Sharma ................. G10L 19/028
(Continued)

OTHER PUBLICATIONS

Gao, R., Feris, R., & Grauman, K. (2018). Learning to Separate Object Sounds by Watching Unlabeled Video. arXiv preprint arXiv: 1804.01665, with a Publication date: Jul. 26, 2018. (Year: 2018).*
(Continued)

*Primary Examiner* — Edgar X Guerra-Erazo
(74) *Attorney, Agent, or Firm* — Foley & Lardner LLP

(57) ABSTRACT

A system for separating audio based on sound producing objects includes a processor configured to receive video data and audio data. The processor is also configured to perform object detection using the video data to identify a number of sound producing objects in the video data and predict a separation for each sound producing object detected in the video data. The processor is also configured to generate separated audio data for each sound producing object using the separation and the audio data.

20 Claims, 10 Drawing Sheets

(51) Int. Cl.

| | | |
|---|---|---|
| G06T 7/70 | (2017.01) | |
| G10L 25/30 | (2013.01) | |
| G10L 25/51 | (2013.01) | |
| G06N 3/084 | (2023.01) | |
| G06N 3/04 | (2023.01) | |
| G10L 25/18 | (2013.01) | |
| G10L 25/57 | (2013.01) | |

(56) References Cited

U.S. PATENT DOCUMENTS

| | | | | |
|---|---|---|---|---|
| 9,495,591 | B2* | 11/2016 | Visser | G06K 9/6293 |
| 10,026,410 | B2* | 7/2018 | Gurijala | G10L 19/018 |
| 10,733,502 | B2* | 8/2020 | Nachum | G06N 3/08 |
| 2014/0108020 | A1* | 4/2014 | Sharma | G10L 19/018 |
| | | | | 704/500 |
| 2017/0133022 | A1* | 5/2017 | Gurijala | G10L 19/028 |
| 2019/0206407 | A1* | 7/2019 | Shukla | G10L 15/24 |
| 2020/0073968 | A1* | 3/2020 | Zhang | G06N 3/08 |
| 2020/0320372 | A1* | 10/2020 | Nachum | G06N 3/08 |

OTHER PUBLICATIONS

Arandjelovic, R., & Zisserman, A. (2017). Look, listen and learn. In Proceedings of the IEEE International Conference on Computer Vision (pp. 609-617). (Year: 2017).*
Aytar, Y., Vondrick, C., & Torralba, A. (2016). Soundnet: Learning sound representations from unlabeled video. Advances in neural information processing systems, 29. (Year: 2016).*
A. Ephrat, I. Mosseri, O. Lang, T. Dekel, K. Wilson, A. Hassidim, W. T. Freeman, and M. Rubinstein, Looking to Listen at the Cocktail Party: A Speaker-Independent Audio-Visual Model for Speech Separation, In SIGGRAPH, 2018.
A. Gabbay, A. Shamir, and S. Peleg, Visual Speech Enhancement, In Interspeech, 2018.
A. Hyvarinen and E. Oja, Independent Component Analysis: Algorithms and Applications, Neural Networks, 2000.
A. J. Simpson, G. Roma, and M. D. Plumbley, Deep Karaoke: Extracting Vocals from Musical Mixtures Using a Convolutional Deep Neural Network, In International Conference on Latent Variable Analysis and Signal Separation, 2015.
A. Owens and A. A. Efros, Audio-Visual Scene Analysis With Self-Supervised Multisensory Features, In ECCV, 2018.
A. Owens, P. Isola, J. McDermott, A. Torralba, E. H. Adelson, and W. T. Freeman, Visually Indicated Sounds, In CVPR, 2016.
A. Senocak, T. H. Oh, J. Kim, M. H. Yang, and I. So Kweon, Learning to Localize Sound Source in Visual Scenes, In CVPR, 2018.
B. Li, K. Dinesh, Z. Duan, and G. Sharma, See and Listen: Score-Informed Association of Sound Tracks to Players in Chamber Music Performance Videos, In ICASSP, 2017.
B. Zhou, H. Zhao, X. Puig, S. Fidler, A. Barriuso, and A. Torralba, Scene Parsing Through ade20k Dataset, In CVPR, 2017.
C. Fevotte, N. Bertin, and J. L. Durrieu, Nonnegative Matrix Factorization with the Itakura-Saito Divergence; With Application to Music Analysis, Neural Computation, 2009.
C. Raffel, B. McFee, E. J. Humphrey, J. Salamon, O. Nieto, D. Liang, D. P. Ellis, and C. C. Raffel, mir_eval: A Transparent Implementation of Common mir Metrics, In ISMIR, 2014.
C. Rother, T. Minka, A. Blake, and V. Kolmogorov, Cosegmentation of Image Pairs by Histogram Matching-Incorporating a Global Constraint Into mrfs, In CVPR, 2006.
D. Griffin and J. Lim, Signal Estimation From Modified Short-Time Fourier Transform, IEEE Transactions on Acoustics, Speech, and Signal Processing, 1984.
D. P. W. Ellis, Prediction-Driven Computational Auditory Scene Analysis, PhD Thesis, Massachusetts Institute of Technology, 1996.
D. Stoller, S. Ewert, and S. Dixon, Adversarial Semi-Supervised Audio Source Separation Applied to Singing Voice Extraction, In ICASSP, 2018.
D. Wang and J. Chen, Supervised Speech Separation Based on Deep Learning: An Overview, IEEE/ACM Transactions on Audio, Speech, and Language Processing, 2018.
D. Yu, M. Koblaek, Z. H. Tan, and J. Jensen, Permutation Invariant Training of Deep Models for Speaker-Independent Multi-Talker Speech Separation, In ICASSP, 2017.
E. F. Lock, K. A. Hoadley, J. S. Marron, and A. B. Nobel, Joint and Individual Variation Explained (Jive) for Integrated Analysis of Multiple Data Types, The Annals of Applied Statistics, 2013.
E. Kidron, Y. Y. Schechner, and M. Elad, Pixels that Sound, In CVPR, 2005.
F. Sedighin, M. Babaie-Zadeh, B. Rivet, and C. Jutten, Two Multimodal Approaches for Single Microphone Source Separation, In 24th European Signal Processing Conference, 2016.
H. Zhao, C. Gan, A. Rouditchenko, C. Vondrick, J. McDermott, and A. Torralba, The Sound of Pixels, In ECCV, 2018.
H. Zhao, C. Gan, W. C. Ma, and A. Torralba, The Sound of Motions, arXiv Preprint arXiv:1904.05979, 2019.
I. Krasin, T. Duerig, N. Alldrin, V. Ferrari, S. Abu-EI-Haija, Z. Kuznetsova, H. Rom, J. Uijlings, S. Popov, S. Kamali, M. Malloci, J. Pont-Tuset, A. Veit, S. Belongie, V. Gomes, A. Gupta, C. Sun, G. Chechik, D. Cai, Z. Feng, D. Narayanan, and K. Murphy, Openimages: A Public Dataset for Large-Scale Multi-Label and Multi-Class Image Classification. Dataset available from https://storage.googleapis.com/openimages/web/index.html, 2017.
J. F. Gemmeke, D. P. Ellis, D. Freedman, A. Jansen, W. Lawrence, R. C. Moore, M. Plakal, and M. Ritter, Audio Set: An Ontology and Human-Labeled Dataset for Audio Events, In ICASSP, 2017.
J. Pu, Y. Panagakis, S. Petridis, and M. Pantic, Audio-Visual Object Localization and Separation Using Low-Rank and Sparsity, In ICASSP, 2017.
J. R. Hershey and J. R. Movellan, Audio Vision: Using Audio-Visual Synchrony to Locate Sounds, In NeurIPS, 2000.
J. R. Hershey, Z. Chen, J. Le Roux, and S. Watanabe, Deep Clustering: Discriminative Embeddings for Segmentation and Separation, In ICASSP, 2016.
J. R. Uijlings, K. E. van de Sande, T. Gevers, and A. W. Smeulders, Selective Search for Object Recognition, IJCV, 2013.
J. W. Fisher III, T. Darrell, W. T. Freeman, and P. A. Viola, Learning Joint Statistical Models for Audio-Visual Fusion and Segregation, In NeurIPS, 2001.
K. He, X. Zhang, S. Ren, and J. Sun, Deep Residual Learning for Image Recognition, In CVPR, 2016.
L. Chen, S. Srivastava, Z. Duan, and C. Xu, Deep Cross-Modal Audio-Visual Generation, In on Thematic Workshops of ACM Multimedia, 2017.
L.v.d. Maaten and G. Hinton, Visualizing Data Using t-sne, JMLR, 2008.
M. Spiertz and V. Gnann, Source-Filter Based Clustering for Monaural Blind Source Separation, In 12th International Conference on Digital Audio Effects, 2009.
0. Ronneberger, P. Fischer, and T. Brox, U-net: Convolutional Networks for Biomedical Image Segmentation, In International Conference on Medical Image Computing and Computer-Assisted Intervention, 2015.
P. Morgado, N. Vasconcelos, T. Langlois, and O. Wang, Self-Supervised Generation of Spatial Audio for 360 Degree Video, In NeurIPS, 2018.
P. S. Huang, M. Kim, M. Hasegawa-Johnson, and P. Smaragdis, Deep Learning for Monaural Speech Separation, In ICASSP, 2014.
P. S. Huang, M. Kim, M. Hasegawa-Johnson, and P. Smaragdis, Joint Optimization of Masks and Deep Recurrent Neural Networks for Monaural Source Separation, IEEE/ACM Transactions on Audio, Speech, and Language Processing, 2015.
P. Smaragdis and M. Casey, Audio/Visual Independent Components, In International Conference on Independent Component Analysis and Signal Separation, 2003.
R. Arandjelovic and A. Zisserman, Objects That Sound, In ECCV, 2018.
R. Gao and K. Grauman, 2.5d Visual Sound, In CVPR, 2019.
R. Gao, R. Feris, and K. Grauman, Learning to Separate Object Sounds by Watching Unlabeled Video, In ECCV, 2018.

(56) References Cited

OTHER PUBLICATIONS

R. Jaiswal, D. FitzGerald, D. Barry, E. Coyle, and S. Rickard, Clustering nmf Basis Functions Using Shifted nmf for Monaural Sound Source Separation, In ICASSP, 2011.

Ruohan Gao and Kristen Grauman, Co-Separating Sounds of Visual Objects, 10 pages.

S. Innami and H. Kasai, Nmt-Based Environmental Sound Source Separation Using Time-Variant Gain Features, Computers & Mathematics with Applications, 2012.

S. Parekh, S. Essid, A. Ozerov, N. Q. Duong, P. Perez, and G. Richard, Motion Informed Audio Source Separation, In ICASSP, 2017.

S. Ren, K. He, R. Girshick, and J. Sun, Faster r-cnn: Towards Real-Time Object Detection with Region Proposal Networks, In NeurIPS, 2015.

T. Afouras, J. S. Chung, and A. Zisserman, The Conversation: Deep Audio-Visual Speech Enhancement, In Inter-Speech, 2018.

T. Virtanen, Monaural Sound Source Separation by Nonnegative Matrix Factorization with Temporal Continuity and Sparseness Criteria, IEEE Transactions on Audio, Speech, and Language Processing, 2007.

T. Virtanen, Sound Source Separation Using Sparse Coding with Temporal Continuity Objective, In International Computer Music Conference, 2003.

X. Guo, S. Uhlich, and Y. Mitsufuji, Nmf-Based Blind Source Separation Using a Linear Predictive Coding Error Clustering Criterion, In ICASSP, 2015.

Y. Tian, J. Shi, B. Li, Z. Duan, and C. Xu, Audio-Visual Event Localization in Unconstrained Videos, In ECCV, 2018.

Y. Zhou, Z. Wang, C. Fang, T. Bui, and T. L. Berg, Visual to Sound: Generating Natural Sound for Videos in the Wild, In CVPR, 2018.

Z. Barzelay and Y. Y. Schechner, Harmony in Motion, In CVPR, 2007.

\* cited by examiner

SYSTEMS AND METHODS FOR VISUALLY GUIDED AUDIO SEPARATION

FIELD OF DISCLOSURE

The present disclosure is generally related to audio analysis and signal processing, including but not limited to separating audio files.

BACKGROUND

The present disclosure relates to audio signal processing. More particularly, the present disclosure relates to separation of audio signals.

SUMMARY

Various embodiments disclosed herein are related to a system for separating audio based on sound producing objects. The system includes a processor configured to receive video data and audio data, according to some embodiments. The processor is also configured to perform object detection using the video data to identify a number of sound producing objects in the video data and predict a separation for each sound producing object detected in the video data, according to some embodiments. The processor is also configured to generate separated audio data for each sound producing object using the separation and the audio data, according to some embodiments.

Various embodiments disclosed herein are related to a method of separating audio data based on sound producing objects in associated video data. The method includes receiving one or more sets of audio data and associated video data, according to some embodiments. The method includes detecting one or more sound producing objects in the video data of the one or more sets, and mixing the audio data of the one or more sets to generate mixed audio data. The method also includes using a neural network to predict a separation for each object detected in the video data of the one or more sets, according to some embodiments. In some embodiments, the predicted separation minimizes a co-separation loss and a consistency loss. The method also includes generating separated audio data for each of the sound producing objects using the separations predicted by the neural network and the mixed audio.

Various embodiments disclosed herein are related to a method for training a neural network to separate audio based on objects present in an associated video. The method includes receiving training data, according to some embodiments. In some embodiments, each training data includes one or more sets of audio data and associated video data. In some embodiments, the method includes performing object detection, mixing the audio data, and training the neural network for each training data. The step of performing object detection can include performing object detection on the video data of the one or more sets to detect one or more sound producing objects of the video data. The step of mixing the audio data can include mixing the audio data of the one or more sets to generate mixed audio data. The method can include training the neural network using the training data to predict a separation for each sound producing object that minimizes a combined loss function.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Overview

Figure 1A:
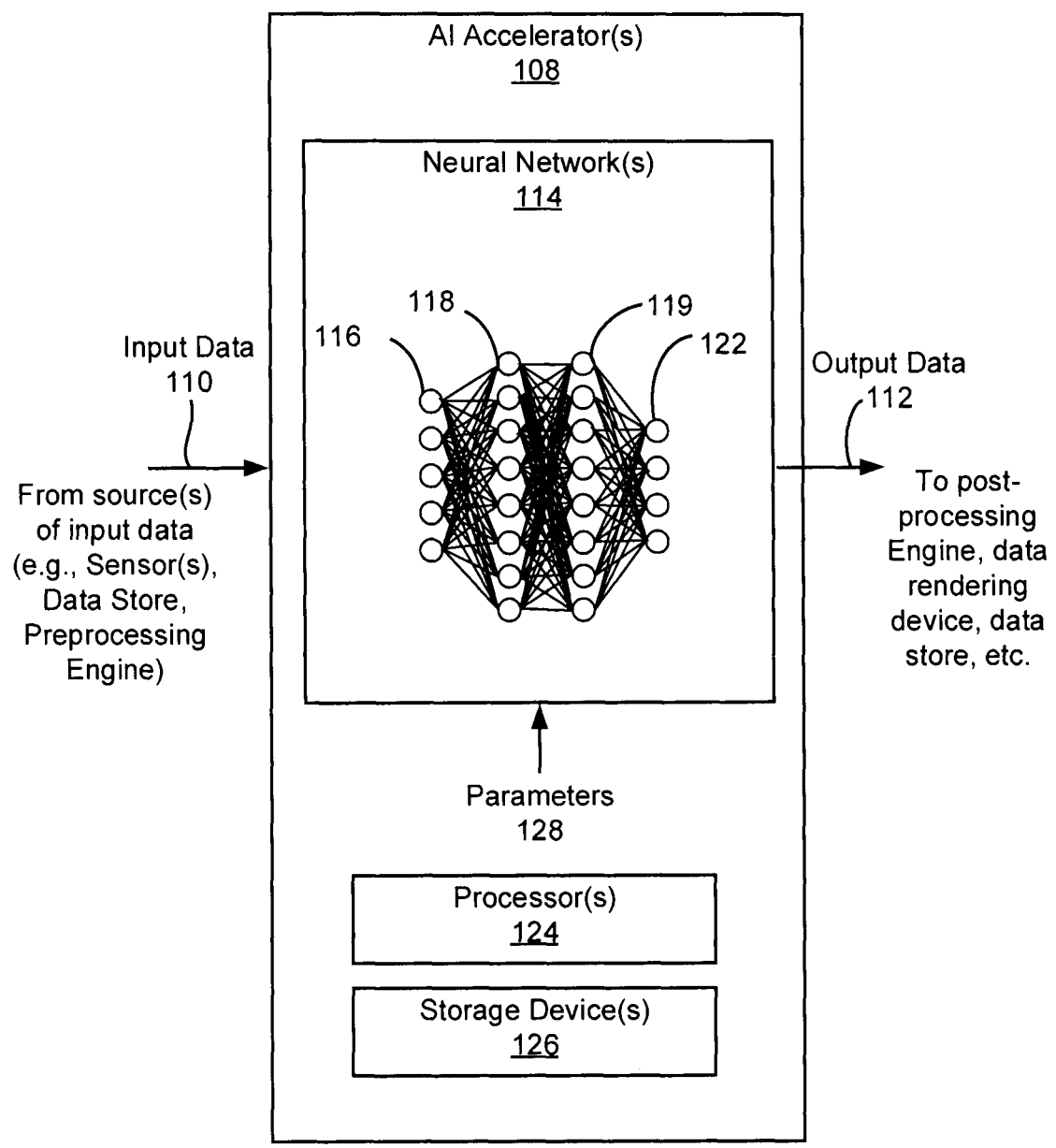
FIG. 1A is a block diagram of an embodiment of a system for performing artificial intelligence (AI) related processing, according to an example implementation of the present disclosure.

Before turning to the FIGURES, which illustrate certain embodiments in detail, it should be understood that the present disclosure is not limited to the details or methodology set forth in the description or illustrated in the FIGURES. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes an environment, system, configuration and/or other aspects useful for practicing or implementing an embodiment of the present systems, methods and devices; and Section B describes embodiments of devices, systems and methods for visually guided audio separation.

Referring generally to the FIGURES, systems and methods for visually guided separation of audio are shown, according to some embodiments. In some embodiments, the systems and methods described herein may be performed in a single processing device (e.g., a processor, processing circuitry, etc.) or may be performed across multiple, distributed, processing devices.

The processing device may include a neural network that is configured to train based on one or more sets of video/audio data. The video/audio data can include a single sound producing object (i.e., single-source video/audio data) or can include multiple sound producing objects (i.e., multi-source video/audio data). It should be understood that the neural network may be trained using either single-source video/audio data or multi-source video/audio data. The processing device may perform object detection on each frame of the one or more sets of video/audio data using a pre-trained object detector. The pre-trained object detector may be configured to perform object detection for a vocabulary of different types or classes of sound-producing objects. The object detector can output object detection data to the neural network indicating how many objects are detected, as well as visual indications or image data of each of the detected objects. The processing device may also mix audio from the one or more video/audio data and generate a spectrogram using the mixed audio. The neural network may receive the object detection data and the magnitude spectrogram and predict various spectrogram masks for the magnitude spectrogram that separate the audio based on the detected objects in the videos. The neural network may be trained to minimize a co-separation loss and a consistency loss. The co-separation loss may be defined based on a difference between a predicted mask and a ground-truth spectrogram ratio mask for the one or more videos (e.g., for two videos). The consistency loss may be a cross-entropy loss function. In some embodiments, the neural network predicts magnitude spectrogram masks that minimize a combined loss function that includes the co-separation loss and the consistency loss. The consistency loss may be multiplied by a weight term that incentivizes the neural network to predict more consistent separation of the audio based on the detected objects. The predicted masks can be multiplied by the spectrogram of the mixed audio to generate a spectrogram for each of the detected objects. The processing device may then use the separated spectrograms to generate real-time audio signals for each of the detected objects.

A. Environment for Artificial Intelligence Related Processing

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) and/or one or more storage devices 126.

Each of the above-mentioned elements or components is implemented in hardware, software, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements). The software can be stored as instructions on a computer readable medium.

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing, forming, building, synthesizing and/or establishing the neural network using architectures that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 128 differently for each neural network 114, or assigning different weights (e.g., hyperparameters, or learning rates), tensor flows, etc. Thus, by setting appropriate parameters 128 for the neural network(s) 114 based on a tuning or training process and the objective of the neural network(s) and/or the sy24stem, this can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose.

The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques in some embodiments.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represent some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduce the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers. Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. The subarea is of a square shape (e.g., size 5 by 5) in some embodiments. The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122 for example. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126. The data can include output data from a neuron of the neural network(s) 114, which can be written to and stored at the storage device 126. For example, the data can include activation data, refined or updated data (e.g., weight information and/or bias information from a training phase for example, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, memory, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108, in parallel for example), sequential processing (e.g., on the same component of an AI accelerator 108, at different times or stages), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics related, internet of things (IoT) related, and other data-intensive or sensor-driven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
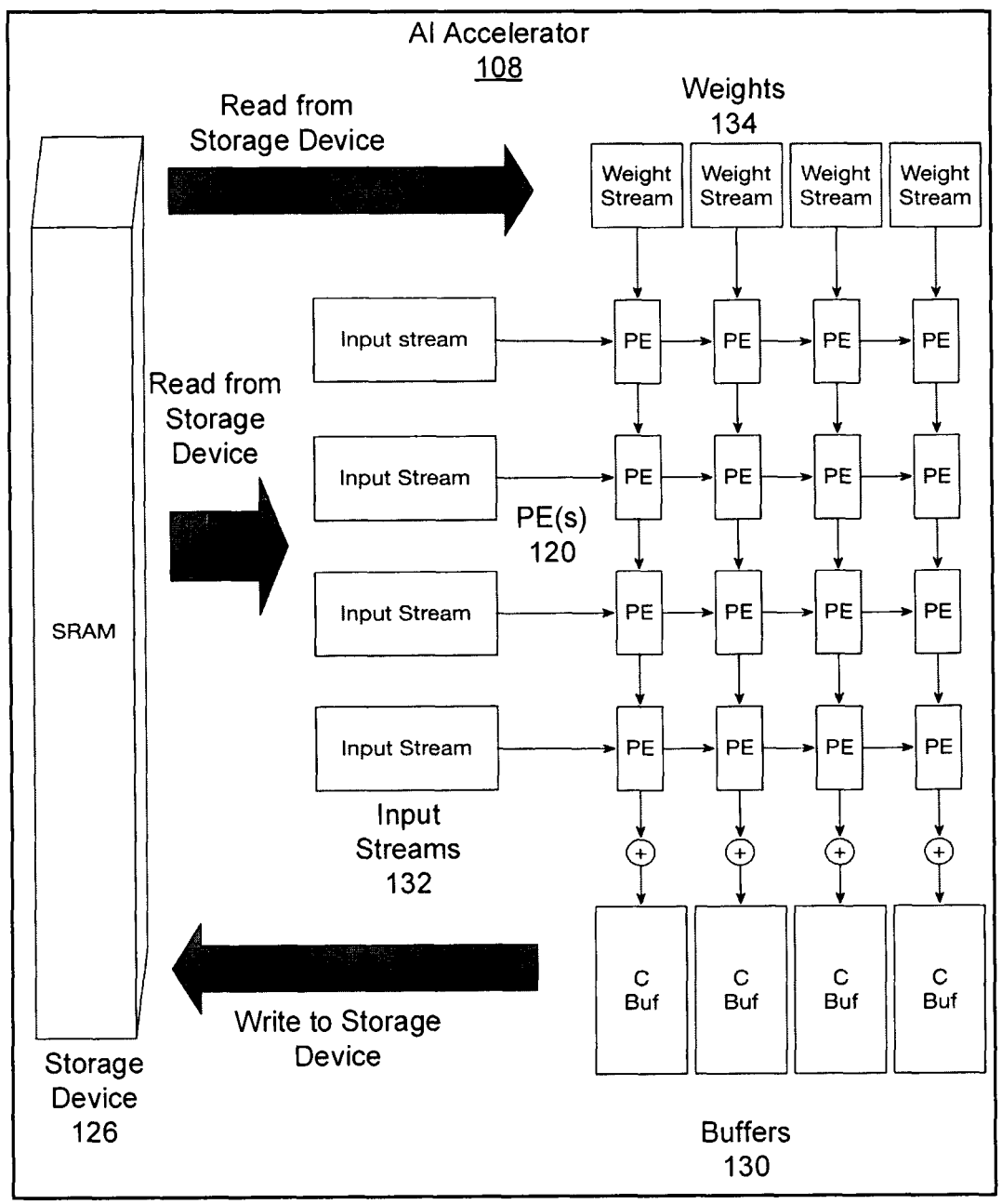
FIG. 1B is a block diagram of an embodiment of a device for performing artificial intelligence (AI) related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The neuron can be implemented as a corresponding PE circuit, and the processing/activation that can occur at the neuron can be performed at the PE circuit. The PEs are connected into a particular network pattern or array, with different patterns serving different functional purposes. The PE in an artificial neural network operate electrically (e.g., in the embodiment of a semiconductor implementation), and may be either analog, digital, or a hybrid. To parallel the effect of a biological synapse, the connections between PEs can be assigned multiplicative weights, which can be calibrated or "trained" to produce the proper system output.

A PE can be defined in terms of the following equations (e.g., which represent a McCulloch-Pitts model of a neuron):

$$\zeta = \Sigma_i w_i x_i \quad (1)$$

$$y = \sigma(\zeta) \quad (2)$$

Where ζ is the weighted sum of the inputs (e.g., the inner product of the input vector and the tap-weight vector), and σ(ζ) is a function of the weighted sum. Where the weight and input elements form vectors w and x, the ζ weighted sum becomes a simple dot product:

$$\zeta = w \cdot x \qquad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some network networks, the output space Y may be as simple as {0, 1}, or it may be a complex multi-dimensional (e.g., multiple channel) space (e.g., for a convolutional neural network). Neural networks tend to have one input per degree of freedom in the input space, and one output per degree of freedom in the output space.

In some embodiments, the PEs can be arranged and/or implemented as a systolic array. A systolic array can be a network (e.g., a homogeneous network) of coupled data processing units (DPUs) such as PEs, called cells or nodes. Each node or PE can independently compute a partial result as a function of the data received from its upstream neighbors, can store the result within itself and can passes the result downstream for instance. The systolic array can be hardwired or software configured for a specific application. The nodes or PEs can be fixed and identical, and interconnect of the systolic array can be programmable. Systolic arrays can rely on synchronous data transfers.

Referring again to FIG. 1B, the input x to a PE 120 can be part of an input stream 132 that is read or accessed from a storage device 126 (e.g., SRAM). An input stream 132 can be directed to one row (horizontal bank or group) of PEs, and can be shared across one or more of the PEs, or partitioned into data portions (overlapping or non-overlapping data portions) as inputs for respective PEs. Weights 134 (or weight information) in a weight stream 134 (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE (e.g., without passing through other PE(s)), or can be routed through one or more PEs (e.g., along a row or column of PEs) to the target PE. The output of each PE can be routed directly out of the PE array (e.g., without passing through other PE(s)), or can be routed through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored to the storage device 126 can be retrieved or read from the storage device 126, and be used as inputs to the array of PEs 120 for processing (of a subsequent layer of the neural network) at a later time. In certain embodiments, the outputs that are stored to the storage device 126 can be retrieved or read from the storage device 126 as output data 112 for the AI accelerator 108.

Figure 1C:
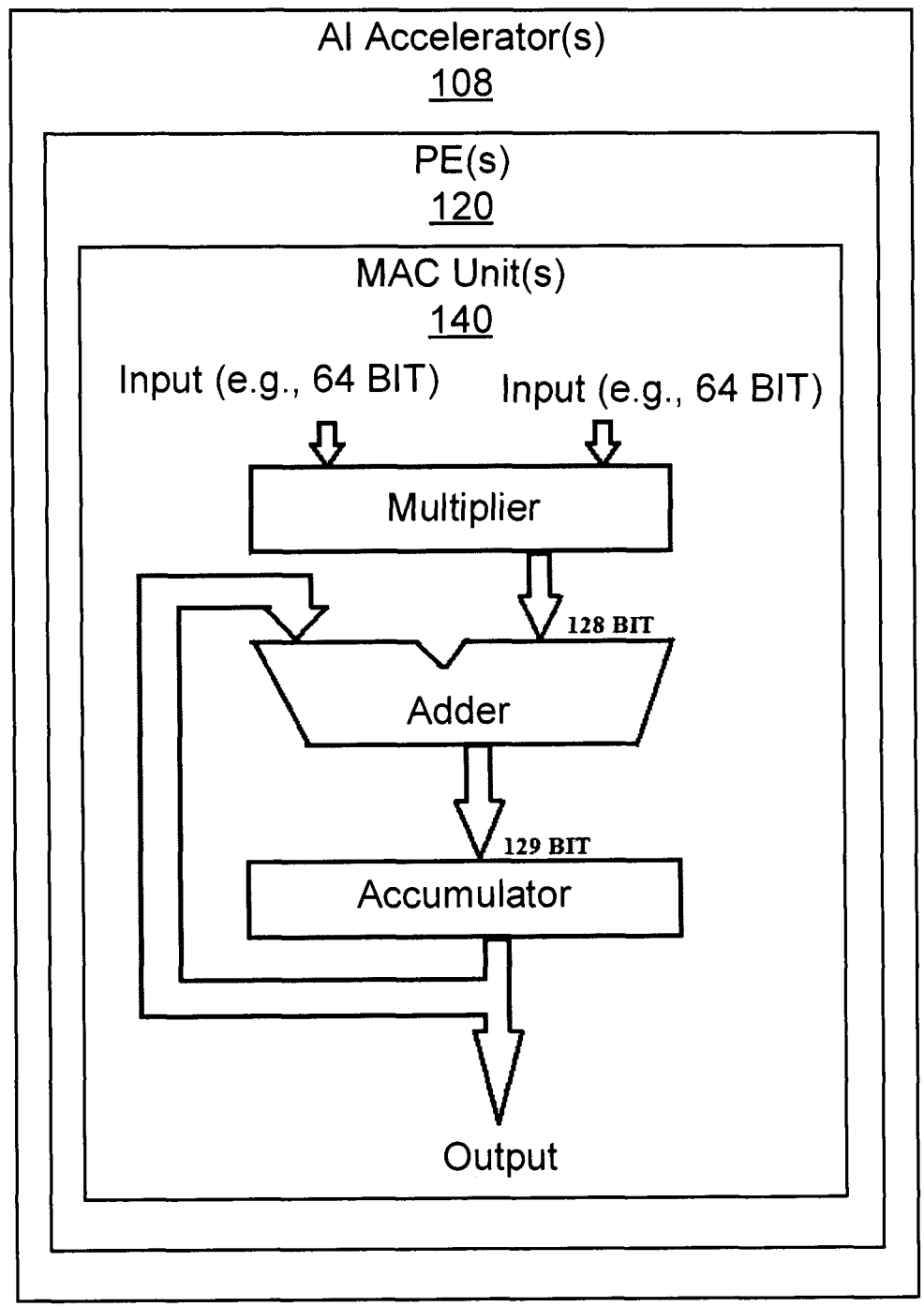
FIG. 1C is a block diagram of an embodiment of a device for performing artificial intelligence (AI) related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuits 140. One or more PEs can sometimes be referred to (singly or collectively) as a MAC engine. A MAC unit is configured to perform multiply-accumulate operation(s). The MAC unit can include a multiplier circuit, an adder circuit and/or an accumulator circuit. The multiply-accumulate operation computes the product of two numbers and adds that product to an accumulator. The MAC operation can be represented as follows, in connection with an accumulator operand a, and inputs b and c:

$$a \leftarrow a + (b \times c) \qquad (4)$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator. An array or plurality of MAC units 140 (e.g., in PEs) can be arranged in a systolic array, for parallel integration, convolution, correlation, matrix multiplication, data sorting, and/or data analysis tasks.

Figure 1D:
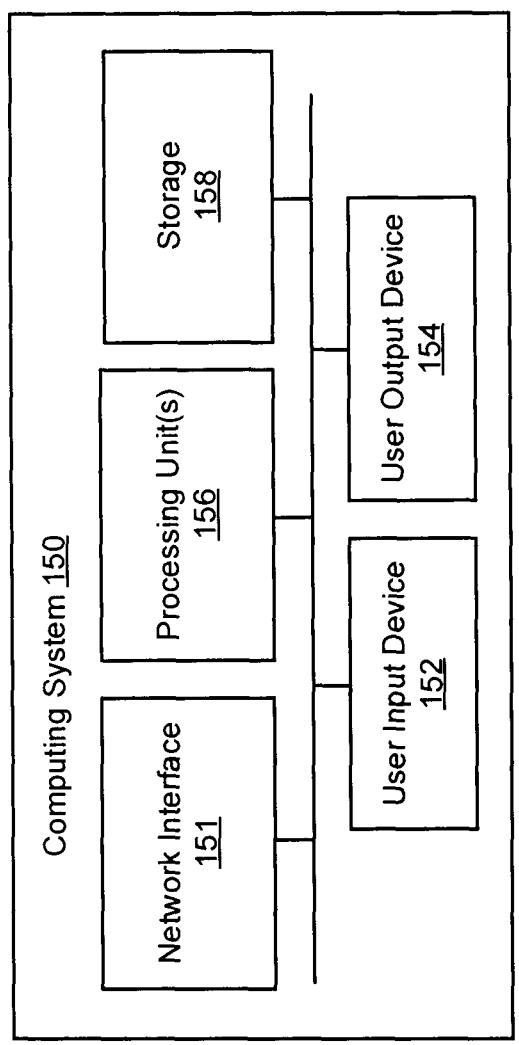
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 154 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

B. Systems, Methods, and Devices for Co-Separating Audio

Referring particularly to FIGS. 2A-2E, various systems, methods, and devices for co-separating audio are shown, according to some embodiments. The systems, methods, and devices described herein can be configured to receive audio and video data as an input and can be configured to co-separate the audio data into separate audio data based on detected objects in the video data. In this way, the systems and methods can be used to split or filter the audio data based on sound producing objects detected in the video data. In this way, the output audio data may include multiple channels or files which are clean or cleaner audio tracks of sound produced by the various objects detected in the video data.

Objects often generate sounds while coexisting or interacting with each other or with other surrounding objects. In this way, rather than being observed in isolation, an observer receives the sounds intertwined with each other and with sound from other sources. Likewise, an audio and/or video device (e.g., a video camera) records the various objects with a single audio channel that mixes all their acoustic frequencies together in some embodiments. In some embodiments, the systems and methods described herein can be used to automatically separate a single audio track into multiple audio tracks for each sound producing object. In some embodiments, the systems and methods described herein are of practical interest for applications including audio denoising, audio-visual video indexing, instrument equalization, audio event remixing, and dialogue following.

Some systems use neural networks and machine learning approaches to separate audio data. Such systems typically train the neural network by mixing various video/audio files and providing the artificially mixed video/audio files to the neural network. However, such artificial mixing may require gathering large amounts of single source audio tracks (e.g., clean "solo" tracks) which can be expensive and can be difficult to scale beyond particular classes of sound producing objects such as human speakers and musical instruments. Second, such an approach implicitly assumes that the sound produced by the objects are independent from each other. However, relationships may exist between real sound sources (e.g., objects, people, etc.) that make source separation more difficult.

Figure 2A:
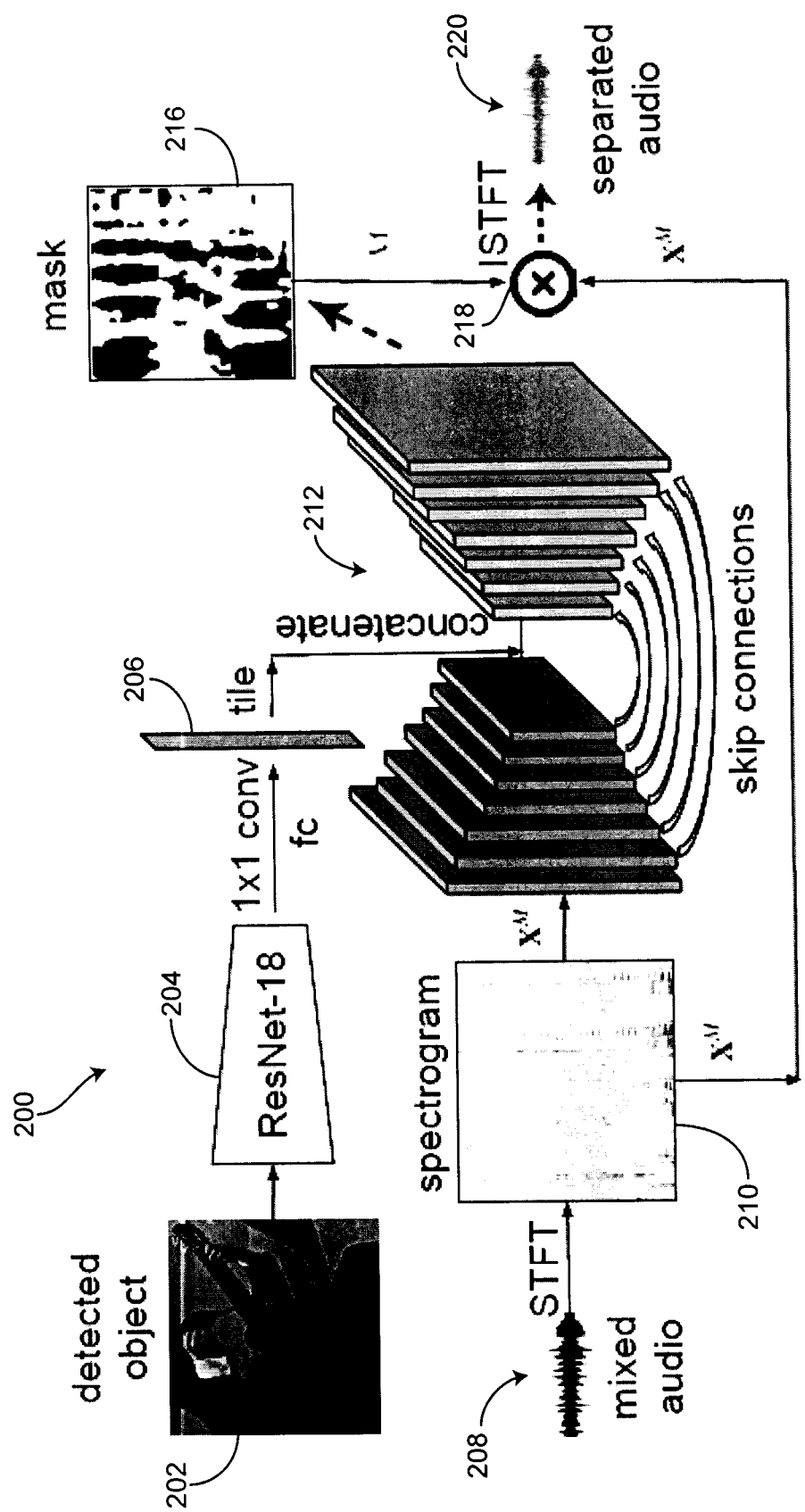
FIG. 2A is a block diagram of a system for performing visually-guided audio separation, according to some embodiments.

Referring particularly to FIG. 2A, a system 200 for separating audio is shown, according to some embodiments. In some embodiments, the system 200 is implemented on a computer, a controller, processing circuitry, etc., or any other computing system or computing architecture as described herein. The system 200 is configured to receive a detected object 202 (e.g., as detected in video data), as well as audio 208 (e.g., mixed audio 208) and output separated audio 220. The separated audio 220 can be an audio track or data of audio produced by the detected object 202. For example, the audio 208 that is input to the system 200 may include audio produced by the detected object 202 in addition to sound or audio produced by other detected objects, ambient noises, etc. The system 200 is configured to analyze the audio 208 and determine the separated audio 220, according to some embodiments. In some embodiments, the audio 208 is a mixed audio. The audio 208 can be any of an MP3 file, a WAV file, an MP4 file, a FLAC file, etc., or any other audio/video file or stream that can include sound data.

The detected object 202 can be object detection data, video data, an indication of a particular class of object that is detected in a video V, etc. For example, the video clip V may include a set of N detected objects such as:

$V=\{O_1, \ldots, O_N\}$. The audio that accompanies the video clip V may be referred to as x(t). In particular, the audio 208 (e.g., mixed audio) may be the audio x(t) that accompanies the video clip V. Each of the N detected objects may be a potential sound source so that the audio x(t) can be expressed as: $x(t)=\Sigma_{n=1}^{N} s_n(t)$ where $s_n(t)$ are time-discrete signals responsible for each object or produced by each object. In some embodiments, the audio x(t) is a single-channel linear mixture of these various sources (e.g., the N objects). In some embodiments, the detected object 202 includes a portion of the video V in which the object is detected. In some embodiments, the detected object 202 also includes an indication of a particular class or type of object that is detected.

The audio 208 (e.g., x(t) or $x_m(t)$ if the audio 208 is artificially mixed audio) can be transferred into a magnitude spectrogram 210. The magnitude spectrogram 210 can also be referred to as $X^M$ where $X^M \in \mathbb{R}_+^{F \times N}$ and the magnitude spectrogram 210 includes F frequency bins and N short-time Fourier transform (STFT) frames. The magnitude spectrogram 210 may encode changes of a signal's frequency and phase content over time.

The system 200 includes a neural network, shown as ResNet network 204 (or any other suitable feature, architecture, neural network, etc.), according to some embodiments. The ResNet network 204 can be used to extract visual features from the detected objects in the video V after a 4$^{th}$ ResNet block. The visual features may have dimensions (H/32)×(W/32)×D where H, W, and D denote the frame and channel dimensions of the visual feature. In some embodiments, the visual features identified by the ResNet network 204 are visual features of the detected object 202. The system 200 can then pass the visual features through a convolution layer 206 to reduce the channel dimension. The system 200 can also use a fully-connected layer to obtain an aggregated visual feature vector associated with the detected object 202. In some embodiments, the convolution layer 206 is a 1×1 convolution layer.

The magnitude spectrogram 210 (e.g., $X^M$) is provided to a U-NET neural network 212, according to some embodiments. The U-NET neural network 212 is configured to take the magnitude spectrogram 210, $X^M$, as an input, and pass the magnitude spectrogram 210 through a series of convolution layers to extract an audio feature of dimension (T/128)×(F/128)×D. The visual feature vector (e.g., the output of the convolution layer 206) can be replicated (T/128)×(F/128) times, then tiled to match the audio feature dimension. The visual feature vector and the audio feature extracted by the U-NET neural network 212 are then concatenated with each other along the channel dimension.

The concatenated visual feature vector and audio feature are then passed through a series of up-convolutions by the U-NET neural network 212 to generate a multiplicative spectrogram mask 216, also referred to as $\mathcal{M}$. The concatenated visual feature vector and audio feature may be a concatenated audio-visual feature map.

A separated spectrogram can be obtained at block 218 by multiplying the multiplicative spectrogram mask 216 by the magnitude spectrogram 210. In particular, the separated spectrogram for the detected object 202 can be determined as $X=X^M \times \mathcal{M}$. Using the multiplicative spectrogram mask 216 and the magnitude spectrogram 210, the system 200 can obtain the separated spectrogram. The separated spectrogram can then be converted or transferred into separated audio 220 by applying inverse short-time Fourier transform (ISTFT).

Figure 2B:
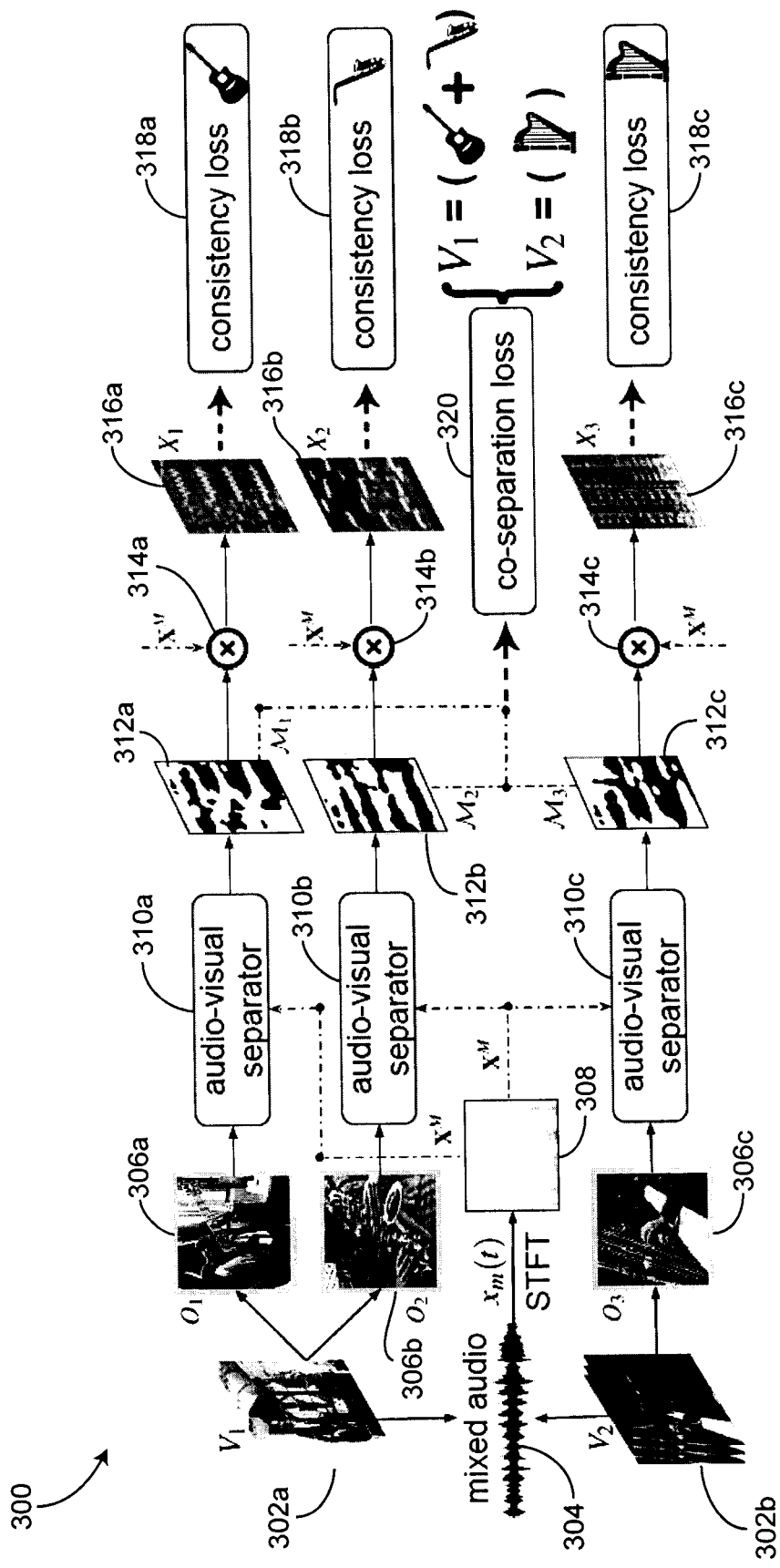
FIG. 2B is a block diagram of a system for performing visually-guided audio separation, according to some embodiments.

Referring particularly to FIG. 2B, a block diagram of a system 300 for training a neural network to separate audio data based on detected objects is shown, according to some embodiments. The system 300 is configured to receive video and associated audio data, according to some embodiments. The video and audio data may be single source, for example, including sounds produced by only one object, or may be multi-source, that is, including sounds produced by more than one object.

The system 300 may receive first video data 302a (i.e., $V_1$) and second video data 302b (i.e., $V_2$), according to some embodiments. In some embodiments, the system 300 receives more than only two sets of video/audio data. For example, while the systems and methods described herein use two sets of video/audio data, the systems may receive any N number of sets of video/audio data or training data. The system 300 performs object detection on the first video data 302a and the second video data 302b. For example, the first video data 302a may be multi-source data, while the second video data 302b is single-source data. In some embodiments, either or both of the first video data 302a and the second video data 302b is single or multi-source data. Specifically, the first video data 302a includes a first object 306a (i.e., $O_1$) and a second object 306b (i.e., $O_2$), whereas the second video data 302b includes only one object, shown as third object 306c (i.e., $O_3$). The audio from each of the first video data 302a and the second video data 302b is extracted and mixed to generate mixed audio 304 (i.e., $x_m(t)$). For example, the audio of the first video data 302a may be referred to as $x_1(t)$ while the audio of the second video data 302b is referred to as $x_2(t)$. The audio data $x_1(t)$ and $x_2(t)$ is then mixed to determine the mixed audio 304: $x_m(t)=x_1(t)+x_2(t)$.

In some embodiments, the system 300 detects the objects $O_1, \ldots, O_n$, for a vocabulary of C objects. In some embodiments, the system 300 includes an object detector that is configured or trained to detect any potential sound-making object categories that may appear in training videos. In some embodiments, the object detector used by the system 300 is a Faster R-CNN with a ResNet-101 backbone, or any other suitable feature, system, architecture, neural network, etc., or combination thereof. For each training video, or each input video data (e.g., first video data 302a and second video data 302b), the object detector is configured to automatically find objects in all the video frames. The object detector can identify a location, a class, etc., of any of the detected objects O. Then, the object detector may gather all object detections across all frames of the video data to obtain a video-level pool of objects.

The mixed audio 304 (i.e., $x_m(t)$) is converted to a magnitude spectrogram 308 (i.e., $X^M$ where $X^M \in \mathbb{R}_+^{F \times N}$) using a short-time Fourier transform (STFT), according to some embodiments. The magnitude spectrogram 308 (i.e., $X^M$) and the detected objects 306 (i.e., $O_1, O_2, O_3$) are then each input into a corresponding audio-visual separator 310. For example, the magnitude spectrogram 308 and the detected object 306a are provided as inputs to audio-visual separator 310a, the magnitude spectrogram 308 and the detected object 306b are provided as inputs to audio-visual separator 310b, and the magnitude spectrogram 308 and the detected object 306c are provided as inputs to audio-visual separator 310c.

The goal of training the audio-visual separators 310 is so that the audio-visual separators 310 can separate the sound each object makes from $x_m(t)$ conditioned on the localized object regions. For example, the videos $V_1$ and $V_2$ include objects $O_1$, $O_2$, and $O_3$, according to some embodiments.

Each of the three objects $O_1$, $O_2$, and $O_3$ may generate a sound signal $s_1(t)$, $s_2(t)$, and $s_3(t)$, respectively. These sound signals $s_1(t)$, $s_2(t)$, and $s_3(t)$ can cooperatively form or define the mixed audio 304 (i.e., $x_m(t)$). The goal of the audio-visual separators 310 is to generate spectrogram masks to independently extract/separate each of the sound signals $s_1(t)$, $s_2(t)$, and $s_3(t)$ from the mixed audio 304 (i.e., $x_m(t)$).

In order to perform separation (e.g., at audio-visual separators 310a-c), the audio-visual separators 310a-c may predict a spectrogram mask $\mathcal{M}_n$ for each of objects $O_1, \ldots, O_n$. In some embodiments, audio-visual separators 310 each use real-valued ratio masks $\mathcal{M}_n$ and obtain predicted magnitude spectrograms for each object $O_1 \ldots O_n$ by soft masking the spectrogram 308 of the mixed audio 304 (i.e., $x_m(t)$): $X_n = X^M \times \mathcal{M}_n$.

For example, $V_1$ may represent a set of objects in the first video data 302a, while $V_2$ may represent a set of objects in the second video data 302b. For each of the input video data (e.g., for the first video data 302a and the second video data 302b) summing separated sounds of all objects should reconstruct the original audio signal associated with that video. For example, the sound signals may be separated such that:

$$x_1(t) = \Sigma_i^{|V_1|} s_i(t) \text{ and } x_2(t) = \Sigma_i^{|V_2|} s_i(t) \quad (5)$$

where $|V_1|$ and $|V_2|$ are the number of detected objects for the videos $V_1$ and $V_2$, respectively, $x_1$ is the audio associated with the video $V_1$, and $x_2$ is the audio associated with the video $V_2$. In this way, summing the individual or separated sounds of each detected object in the video reproduces, recreates, reconstructs, etc., the original audio of that video.

Since system 300 may operate in the frequency domain, the relationship shown in Equation (5) above may hold only approximately due to phase interference. In some embodiments, Equation (5) shown above is approximated by enforcing the following relationship on the predicted magnitude spectrograms:

$$X^{V_1} \approx \Sigma_i^{|V_1|} X_i \text{ and } X^{V_2} \approx \Sigma_i^{|V_2|} X_i \quad (6)$$

where $X^{V_1}$ and $X^{V_2}$ are the magnitude spectrograms for $x_1(t)$ and $x_2(t)$. Accordingly, the separated magnitude spectrograms may be predicted by minimizing a co-separation loss over the separated magnitude spectrograms. The co-separation loss is defined as:

$$L_{co\text{-}separation,spect} = \left\| \sum_{i=1}^{|V_1|} X_i - X^{V_1} \right\|_1 + \left\| \sum_{i=1}^{|V_2|} X_i - X^{V_2} \right\|_1 \quad (7)$$

according to some embodiments. The co-separation loss over the separated magnitude spectrograms may be approximated as minimizing the following loss function over their predicted ratio masks as shown in Equation (8) below:

$$L_{co\text{-}separation,mask} = \left\| \sum_{i=1}^{|V_1|} \mathcal{M}_i - \mathcal{M}^{V_1} \right\|_1 + \left\| \sum_{i=1}^{|V_2|} \mathcal{M}_i - \mathcal{M}^{V_2} \right\|_1 \quad (8)$$

where $\mathcal{M}^{V_1}$ and $\mathcal{M}^{V_2}$ are ground-truth spectrogram ratio masks for each of the two videos, respectively. For example, the ground-truth spectrogram ratio masks for each of the two videos $V_1$ and $V_2$ may be defined as:

$$\mathcal{M}^{V_1} = \frac{X^{V_1}}{X^{V_1} + X^{V_2}} \text{ and } \mathcal{M}^{V_2} = \frac{X^{V_2}}{X^{V_1} + X^{V_2}} \quad (9)$$

where $X^{V_1}$ and $X^{V_1}$ are the magnitude spectrograms for $x_1(t)$ and $x_2(t)$.

In some embodiments, computing loss over masks (as opposed to spectrograms) facilitates improved learning by the neural network. For example, training the neural network to predict spectrogram masks that minimize the mask-based co-separation loss $L_{co\text{-}separation,mask}$ In some embodiments, a neural network is used to predict the spectrogram masks $\mathcal{M}$ for each of the videos $V_1$ and $V_2$, shown in FIG. 2B as spectrogram masks 312a-312c. In some embodiments, a number of spectrogram masks 312a-312c is substantially equal to a total number of detected objects in the videos (e.g., in two videos $V_1$ and $V_2$, in one video, in three videos, etc., or any other number of detected objects in the videos). The spectrogram masks 312a-312c may be used (e.g., by the neural network or by any processing circuit, device, processor, etc., that is configured to implement or perform any of the functionality of system 300) to estimate the co-separation loss $L_{co\text{-}separation,mask}$ as defined in Equation (8) above and represented in FIG. 2B at co-separation loss 320.

The spectrogram masks 312a-312c (i.e., $\mathcal{M}_1$, $\mathcal{M}_2$, $\mathcal{M}_3$, etc.) may be used with the magnitude spectrogram 308 (i.e., $X^M$) to generate, produce, construct, estimate, obtain, etc., magnitude spectrograms 316a-316c (i.e., $X_1$, $X_2$, $X_3$, etc.). In some embodiments, the neural network or the device used to implement system 300 generates the magnitude spectrograms 316a-316c at blocks 314a-314c. In some embodiments, blocks 314a-314c represent multiplication, or any other operations that can be performed to generate the magnitude spectrograms 316a-316c using the spectrogram masks 312a-312c and the magnitude spectrogram 308. In some embodiments, the spectrogram masks 312a-312c are separated for each of the detected objects in the input videos $V_1$, $V_2$, etc.

In addition to the co-separation loss 320 that enforces separation, system 300 may also predict, estimate, obtain, determine, calculate, etc., an object-consistency loss 318a-318c for each of the detected objects or for each predicted spectrogram 316a-316c. If the audio/sound sources (e.g., the sound-producing objects) are well-separated, a predicted "category" or "type" of the separated spectrogram (i.e., magnitude spectrograms 316a-316c) should be consistent with a category of the visually detected object that initially guides the separation thereof. Specifically, for the predicted spectrogram 316a-316c of each object, system 300 can use another ResNet-18 audio classifier that targets the weak labels of the input visual objects. System 300 uses a cross-entropy loss function:

$$L_{object\text{-}consistency} = \frac{1}{|V_1| + |V_1|} \sum_{i=1}^{|V_1|+|V_1|} \sum_{c=1}^{C} -y_{i,c} \log(p_{i,c}) \quad (10)$$

where C is a number of classes, $y_{i,c}$ is a binary indicator on whether c is the correct class for the predicted spectrogram $X_i$, and $p_{i,c}$ is the predicted probability for the class c, according to some embodiments. It should be understood that these audio "classes" are discovered during training and do not require pre-trained sound models for different objects or predetermined classes for the different objects. In some embodiments, the cross-entropy loss function defined in Equation (10) above is used to determine a consistency loss 318a-318c for each of the detected objects. The object consistency loss may quantitatively define a reliability of a separation of sounds produced by a corresponding class of the sound producing objects in the video.

However, it may not always be the case that all sounds in a video are attributable to a visually detected object. To account for ambient sounds, off-screen sounds, noise, environmental sounds, etc., system 300 may incorporate a $C+1^{st}$ "adaptable" audio class. During training of the neural network, each video may be paired with a visual scene feature in addition to the detected objects from the pre-trained object detector. Then an additional mask $\mathcal{M}_{adapt}$ that is responsible for scene context is also predicted in Equation (8) for all of the input videos $V_1$ and $V_2$ to be optimized jointly. These adaptable objects (e.g., ambient sounds, noise, background or environmental sounds, etc.) are collectively designated as having the extra $C+1^{st}$ audio label. The separated spectrograms for these adaptable objects are also trained to match their category label by the object-consistency loss 318 as defined in Equation (10) shown above.

During training of the neural network, the neural network may be trained to discover separations for the multi-source videos that 1) minimize the co-separation loss 320 (as defined in Equation (8) above) such that the audio/sounds generated by the sound-producing objects of the source videos reassemble, reconstruct, combine, etc., to produce their original video-level audio tracks (e.g., such that Equation (1) and/or Equation (2) above is/are true), while also 2) minimizing the object consistency loss 318 (e.g., minimizing Equation (10) shown above) so that the separated sounds for any instances of the same visual object are reliably identifiable as that sound. It should be understood that system 300 can achieve minimization of the object consistency loss 318 without requiring any pre-trained audio model and without requiring any single-source audio examples for the object class. The neural network may learn that the same sound-object sounds should be similar after training the network without requiring predetermined knowledge or information regarding what a given object is expected to sound like.

In some embodiments, the neural network is trained to minimize a combined loss function shown below:

$$L = L_{co\text{-}separation,mask} + \lambda L_{object\text{-}consistency} \quad (11)$$

where L is the combined loss, $L_{co\text{-}separation,mask}$ is the co-separation loss as defined in Equation (8) above, $L_{object\text{-}consistency}$ is the consistency loss as defined in Equation (10) above, and $\lambda$ is a weight associated with the object-consistency loss. In some embodiments, the weight $\lambda$ is an adjustable value that can be increased or decreased by a user or technician to increase or incentivize the neural network to minimize the consistency loss over minimizing the co-separation loss. In some embodiments, the neural network is trained to minimize the combined loss L. In some embodiments, the neural network uses a per-pixel L1 loss for the co-separation loss and weights the gradients by the magnitude of the spectrogram $X^M$ of the mixed audio $x_m(t)$. In some embodiments, the neural network uses weighted gradients of the losses to perform back-propagation, thereby emphasizing predictions of more informative parts of the spectrogram.

Figure 2C:
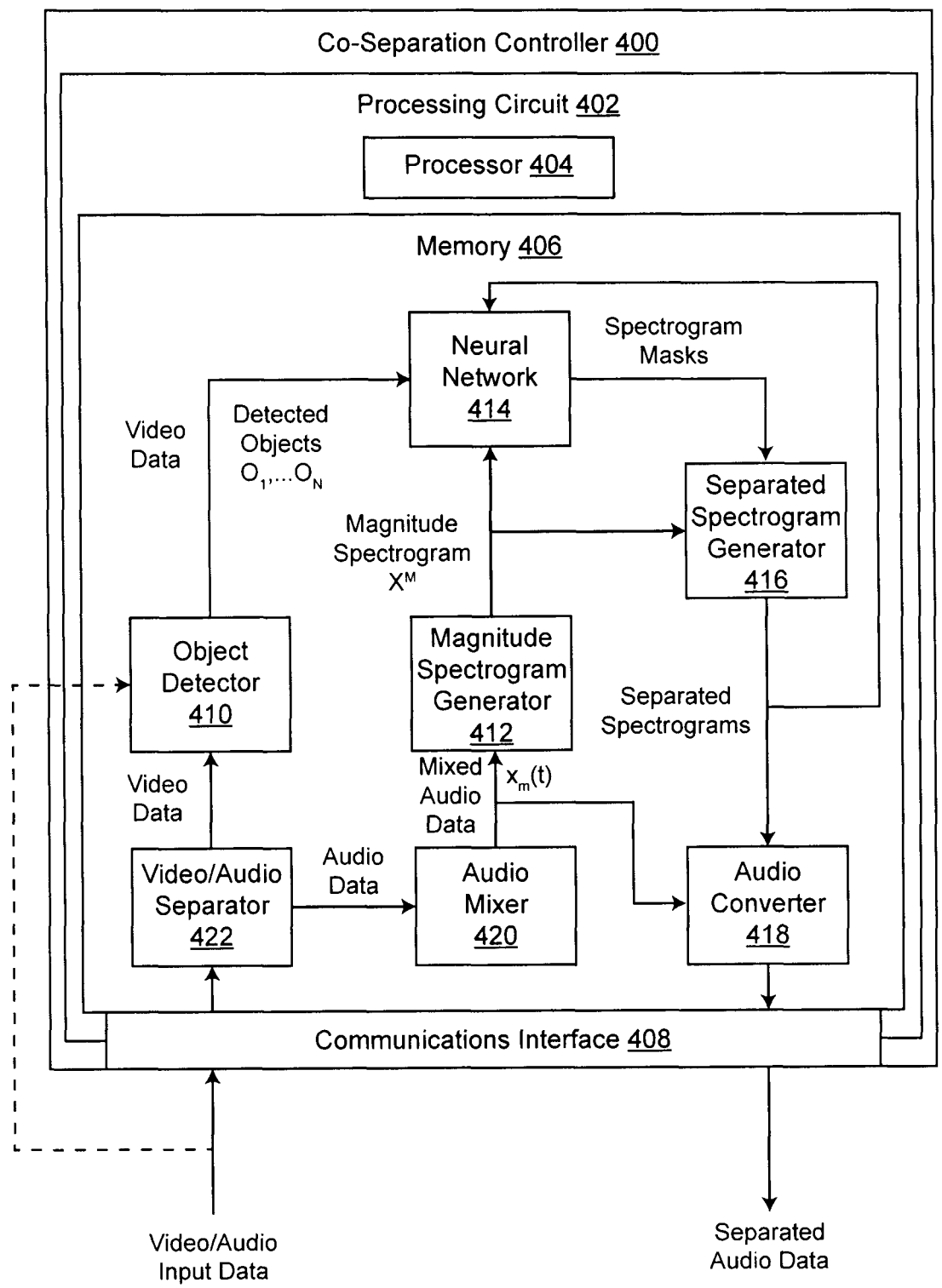
FIG. 2C is a block diagram of a device or controller for performing visually-guided audio separation, according to some embodiments.

During implementation of system 300, the system 300 may receive a single realistic multi-source video for performing source-separation. System 300 may first detect objects in the video frames of the multi-source video by using the pre-trained object detector (e.g., object detector 410 as shown in FIG. 2C and described in greater detail below). For each detected object class, system 300 or the neural network can use the most confident object region(s) as the visual input to separate the portion of the sound that is responsible for particular object categories from the accompanying audio. System 300 can use a sliding window approach to process videos segment by segment with a predetermined (e.g., 10 second) and/or small hop size, and average the audio predictions on overlapping portions of the video segments.

Referring particularly to FIG. 2C, a block diagram of a co-separation controller 400 that is configured to implement system 300 and/or system 200 is shown, according to some embodiments. The controller 400 can include a communications interface 408 that facilitates communications (e.g., the transfer of data) into and out of the controller 400. The communications interface 408 can be or include wired or wireless communications interfaces (e.g., jacks, antennas, transmitters, receivers, transceivers, wire terminals, etc.) for conducting data communications between the controller 400 and external systems, sensors, devices, etc. In various embodiments, communications via the communications interface 408 can be direct (e.g., local wired or wireless communications) or via a communications network (e.g., a WAN, the Internet, a cellular network, etc.). For example, the interface 408 can include an Ethernet card and port for sending and receiving data via an Ethernet-based communications link or network. In another example, the interface 408 can include a Wi-Fi transceiver for communicating via a wireless communications network. In another example, the interface 408 can include cellular or mobile phone communications transceivers. In some embodiments, the interface 408 is an Ethernet interface or a USB interface.

Still referring to FIG. 2C, the controller 400 is shown to include a processing circuit 402 including a processor 404 and memory 406. The processing circuit 402 can be communicably connected to the communications interface 408 such that the processing circuit 402 and the various components thereof can send and receive data via the communications interface. The processor 404 can be implemented as a general purpose processor, an application specific integrated circuit (ASIC), one or more field programmable gate arrays (FPGAs), a group of processing components, or other suitable electronic processing components.

The memory 406 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 406 can be or include volatile memory or non-volatile memory. The memory 406 can include database components, object code components, script components, or any other type of information structure for supporting the various activities and information structures described in the present application. According to some embodiments, the memory 406 is communicably connected to the processor 404 via the processing circuit 402 and includes computer code for executing (e.g., by the processing circuit 402 and/or the processor 404) one or more processes described herein.

Referring still to FIG. 2C, the memory 406 includes a video/audio separator 422, according to some embodiments. In some embodiments, the video/audio separator 422 is configured to receive video/audio input data via the communications interface 408. For example, the controller 400 (or more particularly the video/audio separator 422) may receive the input videos $V_1$, $V_2$, etc., and the corresponding audio associated with each input video. In some embodiments, the video/audio separator 422 is configured to receive multiple sets of input data. Each set of input data can include video data $V_i$ and associated audio data. In some embodiments, the input data that is received by video/audio separator 422 is multi-source video/audio data that includes sounds produced by more than one sound-producing object. In some embodiments, one or more of the sets of input data are multi-source video/audio data.

The video/audio separator 422 may separate the video data and the audio data from each set of input data. In some embodiments, the video/audio separator 422 is configured to perform any of the functionality, techniques, etc., of audio-visual separators 310a-310c as described in greater detail above with reference to FIG. 2B. The video/audio separator 422 may provide the audio data from each video or from each set of input data to audio mixer 420.

In some embodiments, audio mixer 420 is configured to receive the audio data from video/audio separator 422 and mix, merge, etc., the audio data to generate mixed audio data. In some embodiments, audio mixer 420 provides the mixed audio data to magnitude spectrogram generator 412. In some embodiments, audio mixer 420 is configured to generate or output mixed audio 304 (e.g., $x_m(t)$).

Magnitude spectrogram generator 412 is configured to receive the mixed audio data $x_m(t)$ from audio mixer 420 and generate a magnitude spectrogram $X^M$ based on the mixed audio data $x_m(t)$. In some embodiments, magnitude spectrogram generator 412 is configured to generate or output the magnitude spectrogram 308 (i.e., $X^M$) using any of the techniques or functionality as described in greater detail above with reference to FIG. 2B.

Magnitude spectrogram generator 412 may use an STFT technique to convert the mixed audio data into the magnitude spectrogram $X^M$. In some embodiments, magnitude spectrogram generator 412 provides the magnitude spectrogram $X^M$ to neural network 414 and/or separated spectrogram generator 416.

Video/audio separator 422 may provide the video data to object detector 410, according to some embodiments. In some embodiments, object detector 410 alternatively receives the video/audio input data from the external or other device. Object detector 410 is configured to perform object detection for each of the video data received from video/audio separator 422 or on any of the video data received by controller 400. In some embodiments, object detector 410 is configured to detect sound-producing objects $O_1 \ldots O_n$ in the video data received from video/audio separator 422 or in the video/audio input data. In some embodiments, object detector 410 is configured to detect a vocabulary of C objects (e.g., different classes of objects). In some embodiments, object detector 410 is pre-trained to detect different types of objects in the video data. In some embodiments, object detector 410 is configured to automatically detect or find objects in all frames of the video data that is input to object detector 410. Object detector 410 can use a Faster R-CNN object detector with a ResNet-101 backbone that is trained with open images or other training data. In some embodiments, other object detectors are used.

Object detector 410 can detect multiple sound-producing objects in each frame of each set of input data. In some embodiments, object detector 410 is configured to output the video data on which object detection is performed as well as the detected objects $O_1 \ldots O_N$ or object detection data to neural network 414. Object detector 410 may also output a confidence associated with each detected object $O_1 \ldots O_N$. In some embodiments, object detector 410 is trained on images of C=15 (or any other number) of object categories using visual training data. In some embodiments, object detector 410 is configured to filter out low confidence object detections for each video (e.g., if the confidence associated with an object detection is below a minimum threshold) and keep the top two detected categories (e.g., the two object detection classes or categories that have the highest confidence). During training of the neural network 414, object detector 410 may randomly sample 64 pairs of videos for each batch or set of training data. In some embodiments, object detector 410 is configured to sample a confident object detection (e.g., above a predetermined confidence threshold) for each class as its input visual object paired with a random scene image that is sampled from a training dataset, a database, an image dataset, publicly accessible training data, etc. In some embodiments, object detector 410 resizes an object window to 256×256 pixels and a randomly cropped 224×224 region is used as an input to neural network 414. In some embodiments, object detector 410 is the same as or similar to ResNet network 204 as described in greater detail above with reference to FIG. 2A and is configured to perform any of the functionality, techniques, etc., of ResNet network 204.

Referring still to FIG. 2C, neural network 414 is configured to receive the detected objects $O_1 \ldots O_N$ and the video data from object detector 410. Neural network 414 is also configured to receive the magnitude spectrogram $X^M$ of the mixed audio data $x_m(t)$ from magnitude spectrogram generator 412. In some embodiments, neural network 414 includes or is configured to perform any of the techniques, functionality, etc., of the neural networks or devices described in greater detail above with reference to FIGS. 1A-1D.

Neural network 414 may be trained to predict spectrogram masks that minimize the combined loss function as shown in Equation (11) above. In some embodiments, neural network 414 and/or processing circuit 402 is configured to determine, calculate, obtain, etc., the co-separation loss $L_{co\text{-}separation,mask}$ using Equation (8) as described in greater detail above based on the spectrogram masks that are predicted or output by neural network 414. In some embodiments, neural network 414 and/or processing circuit 402 is configured to determine, calculate, obtain, etc., the consistency loss $L_{object,consistency}$ using Equation (10) as described in greater detail above based on the spectrograms output by separated spectrogram generator 416. In this way, neural network 414 can construct, generate, and use the combined loss function as shown in Equation (11). In some embodiments, neural network 414 is the same as or similar to the U-NET neural network 212 as described in greater detail above with reference to FIG. 2A and may be configured to perform any of the functionality, techniques, etc., of the U-NET neural network 212 as described in greater detail above.

The neural network 414 may be trained using various input data at video/audio separator 422. In this way, the neural network 414 may train such that the neural network 414 is configured to minimize the combined loss function (Equation (11)). The neural network 414 may be trained such that the neural network 414 outputs or predicts spectrogram masks for each of the detected objects $O_1 \ldots O_N$ that minimize both the consistency loss $L_{object,consistency}$ and the co-separation loss $L_{co-separation,mask}$. In some embodiments, the neural network 414 uses horizontal flipping, as well as color and intensity jittering as data augmentation. The weight λ of the combined loss function may be initially set of 0.05 for training of the neural network 414. In some embodiments, the neural network 414 is trained using an Adam optimizer with a weight decay of $1\times10^{-4}$ and a starting learning rate of $1\times10^{-4}$. In some embodiments, the object detector 410 uses a smaller initial or starting learning rate of $1\times10^{-5}$ since it is pre-trained for visual feature or object detection. It should be understood that while object detector 410 can be pre-trained to accelerate convergence, it is not pre-trained for audio classification. The neural network 414 is trained to automatically discover the audio classes for the different sound-producing objects.

In some embodiments, the neural network 414 is configured to use multiple sets of video/audio input data during training (e.g., two sets of video/audio input data as shown in FIG. 2B). In some embodiments, after the neural network 414 has been trained, the neural network 414 may receive a single set of video/audio input data and predict spectrogram masks for each of the detected objects in the single set of video/audio input data. In some embodiments, the neural network 414 outputs the spectrogram masks for each detected object to separated spectrogram generator 416.

Referring still to FIG. 2C, memory 406 includes separated spectrogram generator 416 that is configured to receive the spectrogram masks for each detected object from neural network 414 and the magnitude spectrogram $X^M$ of the mixed audio data $x_m(t)$. Separated spectrogram generator 416 is configured to receive the spectrogram masks (e.g., the spectrogram masks 312a-312c, $\mathcal{M}_1$, $\mathcal{M}_2$, $\mathcal{M}_3$, etc.) and the magnitude spectrogram $X^M$ and generate, construct, output, etc., a separated magnitude spectrogram (e.g., magnitude spectrograms 316a-316c, $X_1$, $X_2$, $X_3$, etc.) for each of the detected objects $O_1 \ldots O_N$. In some embodiments, separated spectrogram generator 416 is configured to provide the separated spectrograms to neural network 414 for calculating the object consistency loss $L_{object-consistency}$. In some embodiments, separated spectrogram generator 416 also outputs the separated spectrograms to audio converter 418.

Referring still to FIG. 2C, audio converter 418 may be configured to generate separated audio for each of the separated spectrograms. In some embodiments, audio converter 418 can receive the mixed audio data $x_m(t)$ from audio mixer 420. Audio converter 418 may use the separated spectrograms and the mixed audio data $x_m(t)$ to generate separated audio data of each of the detected objects. In some embodiments, audio converter 418 is configured to output the separated audio data for further processing, text-to-speech, etc. Audio converter 418 may apply ISTFT to the spectrograms to generate or produce separated real-time audio signals.

Figure 2D:
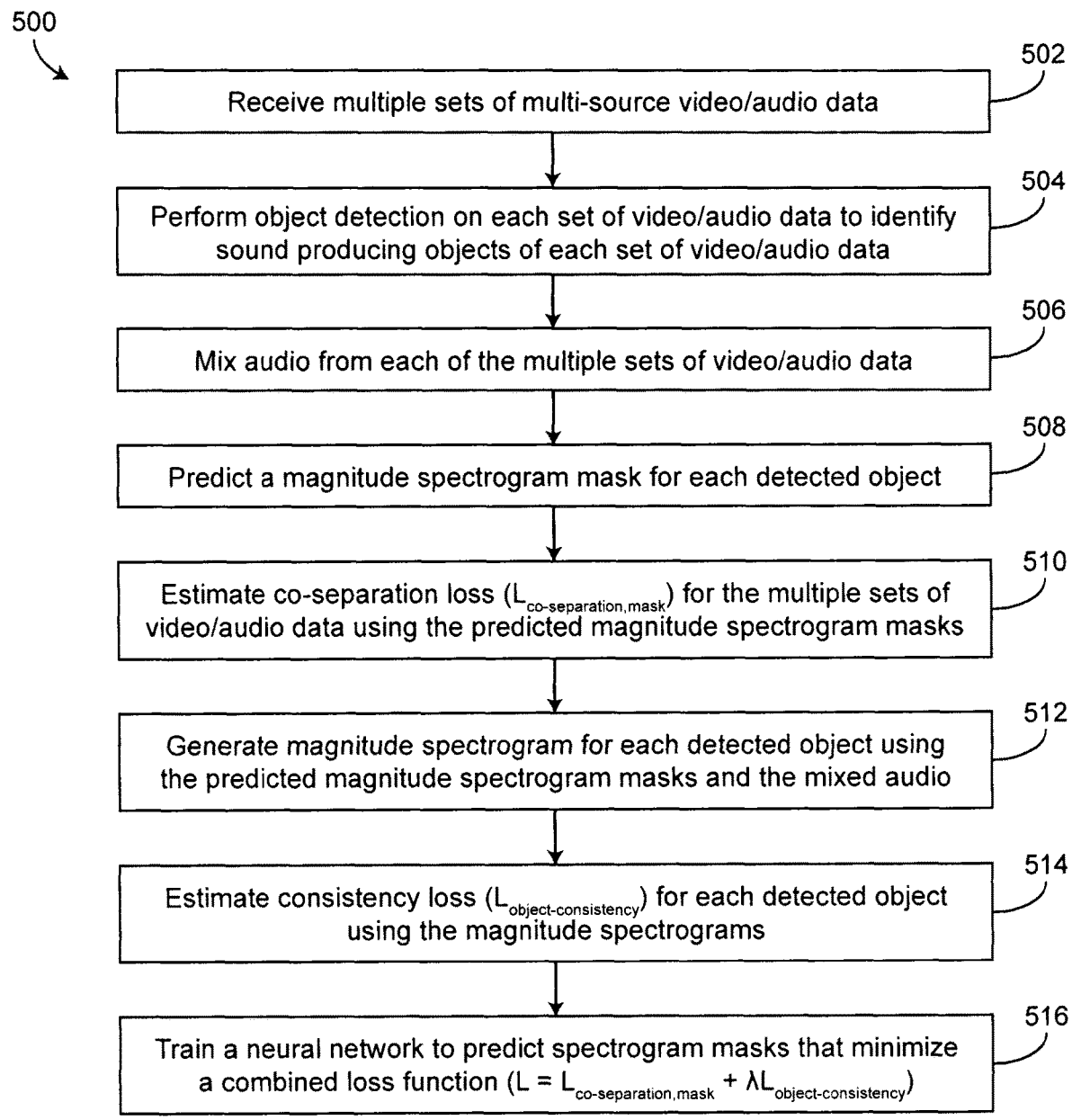
FIG. 2D is a flow diagram of a process for training a neural network to separate audio based on object detection data, according to some embodiments.
Figure 2E:
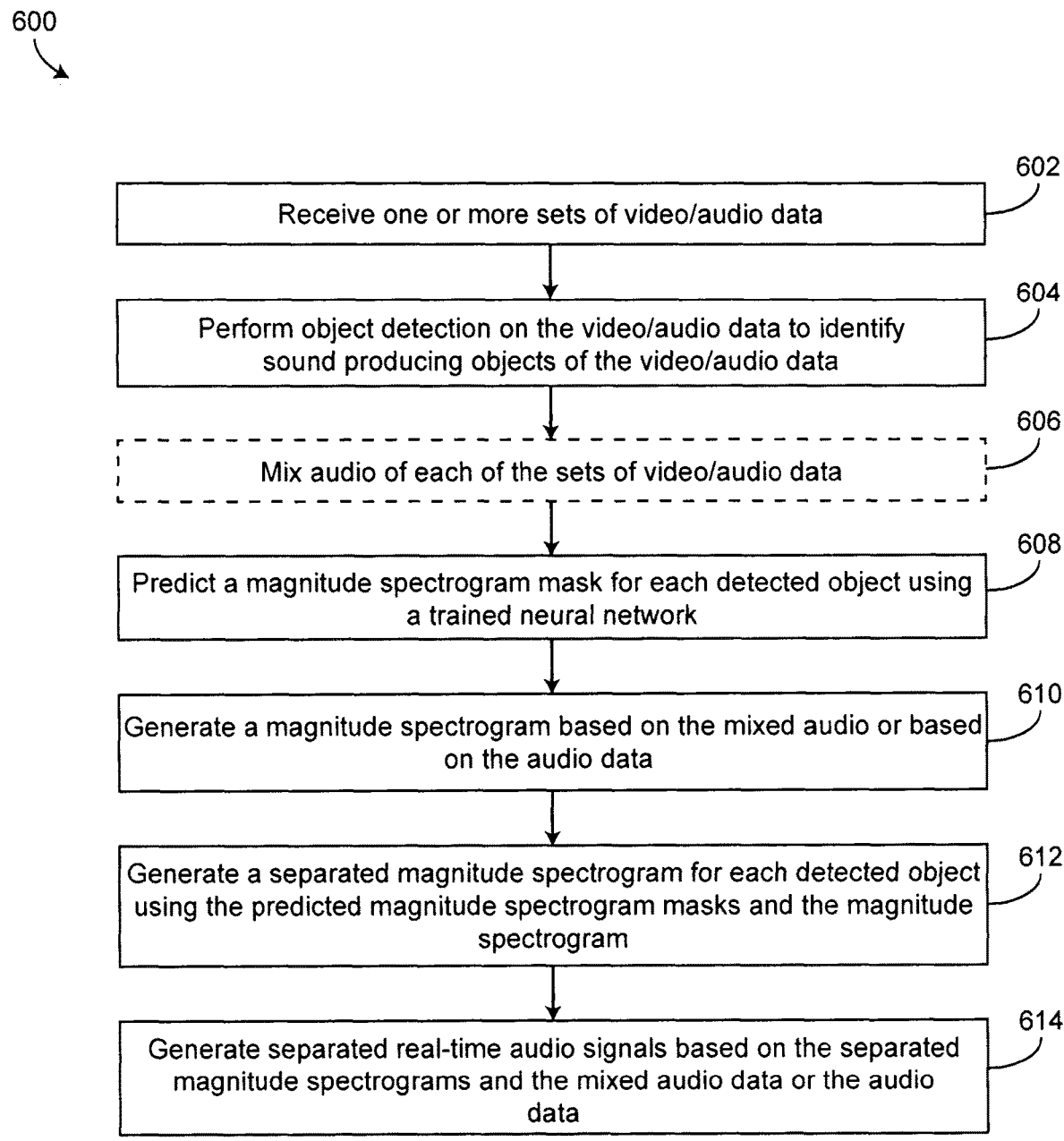
FIG. 2E is a flow diagram of a process for using the trained neural network of FIG. 2D to separate audio based on object detection data, according to some embodiments.

Referring particularly to FIG. 2D, a process 500 for training a neural network to separate or co-separate audio data based on object detection data is shown, according to some embodiments. Process 500 includes steps 502-516 and can be performed by controller 400, system 300, system 200, any other computing environment that is configured to implement the systems and methods described herein. In some embodiments, process 500 is performed to train the neural network 414. It should be understood that any of the steps of process 500 may be performed concurrently with any of the other steps of process 500.

Process 500 includes receiving multiple sets of multi-source video/audio data (step 502), according to some embodiments. In some embodiments, step 502 is performed by controller 400, or more specifically, by video/audio separator 422. In some embodiments, one or more or all of the sets of video/audio data are multi-source, that is, include more than one sound-producing object.

Process 500 includes performing object detection on each set of video/audio data to identify sound producing objects of each set of video/audio data (step 504), according to some embodiments. In some embodiments, step 504 is performed by object detector 410 or by ResNet network 204 using any of the techniques, functionality, etc., described herein. Step 504 can be performed to identify a number of sound producing objects in each set of the video/audio data. In some embodiments, step 504 is performed to generate object detection data.

Process 500 includes mixing the audio from each of the multiple sets of video/audio data (step 506), according to some embodiments. In some embodiments, step 506 is performed by audio mixer 420. Audio mixer 420 may mix, merge, etc., the audio of the multiple sets of video/audio data to generate mixed audio data $x_m(t)$. Audio mixer 420 can provide the mixed audio $x_m(t)$ to any of magnitude spectrogram generator 412 and/or audio converter 418 to perform step 506.

Process 500 includes predicting a magnitude spectrogram mask for each detected object (step 508), according to some embodiments. In some embodiments, a neural network (e.g., neural network 414) is configured to predict the magnitude spectrogram mask for each detected object in the video/audio data. Step 508 can be performed by neural network 414 using any of the techniques or functionality described in greater detail above. In some embodiments, neural network 414 initially predicts the magnitude spectrogram mask for each of the detected objects using initial parameters.

Process 500 includes estimating co-separation loss $L_{co-separation,mask}$ for each of the predicted magnitude spectrogram masks output by the neural network (e.g., as predicted in step 508) (step 510), according to some embodiments. In some embodiments, the co-separation loss is predicted based on the magnitude spectrogram masks, or based on magnitude spectrograms that are obtained or calculated based on the magnitude spectrogram masks. In some embodiments, step 510 is performed by controller 400, or more specifically, by a component of controller 400. For example, neural network 414 may be configured to estimate the co-separation loss for each of the predicted magnitude spectrogram masks to identify if the predicted magnitude spectrogram masks sufficiently separate the sounds produced by the detected objects. The co-separation loss may be estimated by controller 400 based on the predicted magnitude spectrogram masks using Equation (8) or may be estimated based on magnitude spectrograms that result from the predicted magnitude spectrogram masks using Equation (7).

Process 500 includes generating a magnitude spectrogram for each detected object using the predicted magnitude spectrogram masks and the mixed audio (step 512), according to some embodiments. In some embodiments, the magnitude spectrograms are magnitude spectrograms 316a-316c. In some embodiments, step 512 is performed by separated spectrogram generator 416 using the spectrogram masks predicted by the neural network (e.g., the neural network 414) and the magnitude spectrogram $X^M$ of the mixed audio data $x_m(t)$.

Process 500 includes estimating a consistency loss $L_{object\text{-}consistency}$ for each detected object using the magnitude spectrograms generated in step 512 (step 514), according to some embodiments. In some embodiments, the consistency loss is estimated by the controller 400 or more particularly by the neural network 414 using the Equation (10) shown above. The consistency loss may be a cross-entropy loss function that quantifies how consistently the sounds produced by the detected objects are co-separated.

Process 500 includes training the neural network to predict spectrogram masks that minimize a combined loss function (e.g., the combined loss function as expressed in Equation (11) shown above, step 516), according to some embodiments. In some embodiments, the neural network is neural network 414. In some embodiments, the neural network is trained based on the multiple sets of multi-source video/audio data so that the neural network predicts magnitude spectrogram masks that minimize the combined loss function. In this way, the neural network can be used to generate magnitude spectrogram masks for non-training data (described in greater detail below with reference to FIG. 2E). The neural network may be trained using any of the training techniques described in greater detail above. In some embodiments, the neural network is a U-NET neural network.

Referring now to FIG. 1E, a process 600 for using the neural network trained in process 500 is shown, according to some embodiments. In some embodiments, process 600 includes steps 602-614. Steps 602-614 can be performed by controller 400 using the neural network trained according to process 500. For example, the neural network 414 may undergo a training period or a training phase so that neural network 414 may predict magnitude spectrogram masks that minimize the combined loss function.

Process 600 includes receiving one or more sets of video/audio data (step 602), according to some embodiments. In some embodiments, step 602 is the same as or similar to step 502. However, after the neural network has been trained, controller 400 may perform any of the co-separation operations for a single (or multiple) sets of video/audio data (e.g., single source, or multi-source video/audio data that includes more than one sound-producing objects). In some embodiments, step 602 is performed by video/audio separated 408.

Process 600 includes performing object detection on the video/audio data to identify various sound producing objects of the video/audio data (step 604), according to some embodiments. In some embodiments, step 604 is the same as or similar to step 504 of process 500. For example, step 604 may be performed by object detector 410 or by ResNet network 204 to obtain object detection data.

Process 600 includes mixing audio of each of the sets of the video/audio data (step 606), according to some embodiments. In some embodiments, step 606 is optional. For example, if only a single set of video/audio data is received at step 602, step 606 may be skipped. If multiple sets of video/audio data are received at step 602, step 606 may be performed to mix the audio of the multiple sets of video/audio data. In some embodiments, step 606 is performed by audio mixer 420.

Process 600 includes predicting a magnitude spectrogram mask for each detected object using a trained neural network (step 608), according to some embodiments. In some embodiments, the neural network that is used to predict the magnitude spectrogram masks is trained according to process 500 so that the neural network predicts magnitude spectrogram masks that minimize both the co-separation loss $L_{co\text{-}separation,mask}$ and a weighted object consistency loss term $\lambda L_{object\text{-}consistency}$. For example, the neural network may be trained to minimize the combined loss function shown in Equation (11) above. In some embodiments, the neural network is neural network 414. The number of magnitude spectrogram masks predicted by the neural network may be substantially equal to the number of detected objects in the one or more sets of video/audio data. In some embodiments, an additional magnitude spectrogram mask is predicted by the trained neural network that accounts for ambient, environmental, background noise, etc., or off-screen sound producing objects.

Process 600 includes generating a magnitude spectrogram based on the mixed audio or based on the audio data (step 610), according to some embodiments. In some embodiments, the magnitude spectrogram is generated by magnitude spectrogram generator 412 to perform step 610. In some embodiments, step 610 includes generating the magnitude spectrogram based on or using the mixed audio if multiple sets of video/audio data are received at step 602 (and step 606 is performed). In some embodiments, step 610 includes generating the magnitude spectrogram based on or using the audio data received at step 602 if only a single set of video/audio data is received at step 602. In some embodiments, the magnitude spectrogram is the magnitude spectrogram 308 (i.e., magnitude spectrogram $X^M$) as described in greater detail above with reference to FIG. 2B.

Process 600 includes generating a separated magnitude spectrogram for each detected object using the predicted magnitude spectrogram masks and the magnitude spectrogram (step 612), according to some embodiments. In some embodiments, step 612 is performed by separated spectrogram generator 416. The separated magnitude spectrogram may be generated for each of the detected objects using the spectrogram 308 of the mixed audio 304. For example, the separated spectrogram generator 416 may mask the magnitude spectrogram of the mixed audio or the received audio with the predicted magnitude spectrogram masks of each detected object to generate a separated magnitude spectrogram for each detected object.

Process 600 includes generating separated real-time audio signals based on the separated magnitude spectrograms and the mixed audio data or the audio data (step 614), according to some embodiments. In some embodiments, step 614 is performed by audio converter 418. Audio converter 418 may receive the separated spectrograms from separated spectrogram generator 416 and the mixed audio or the audio data from video/audio separator 422. In some embodiments, audio converter 418 performs step 614 by using an inverse short-time Fourier transform and the separated spectrograms received from separated spectrogram generator 416. Step 614 can include generating several sets of separated real-time audio signals. The number of the sets of separated real-time audio signals may be substantially equal to the number of detected objects in the video data. In some embodiments, the number of the sets of separated real-time audio signals is one more than the number of detected objects in the video data. For example, audio converter 418 may also output a separated real-time audio signal of background, ambient, environmental, etc., sounds, or sounds produced by off-screen objects.

Advantageously, the systems (e.g., system 200, system 300, controller 400, etc.) and the methods (e.g., process 500, process 600, etc.) described herein can be used to separate audio or sounds produced by objects in a video. The systems and methods described herein can also be used to train a neural network based on mixed multi-source video/audio data. The neural network can then be used to predict magnitude spectrogram masks that minimize co-separation loss and consistency loss. Advantageously, the neural network may be trained on multi-source video/audio data which has intertwined sounds produced by various objects in the scene. This may facilitate better separation of sounds produced by objects in multi-source video/audio data when the trained neural network is implemented for non-training video/audio data. Training the neural network with realistic multi-source video/audio data may improve the separation accuracy of the neural network. Additionally, the systems and methods herein use soft spectrogram masking which can improve the accuracy of the separation. For example, the neural network can be configured to predict the spectrogram masks which may facilitate improved separation accuracy compared to prediction of spectrograms or raw waveforms for source separation. Additionally, computing the losses (e.g., the co-separation loss and the consistency loss) over masks as opposed to spectrograms may facilitate improved learning/training of the neural network. In some embodiments, training the neural network using multi-source video/audio data improves a separation of the accuracy when the neural network is used to predict magnitude spectrograms to separate sounds of objects in non-training video/audio data.

Figure 2F:
FIG. 2F is a T-distributed Stochastic Neighbor Embedding plot of separated sounds generated using the systems and methods described herein, according to some embodiments.

Referring particularly to FIG. 2F, a T-distributed Stochastic Neighbor Embedding (t-SNE) plot 700 generated using the systems and methods described herein is shown, according to some embodiments. As shown in FIG. 2F, the neural network 414 has been trained for 15 categories of objects (e.g., various instruments shown in the right hand column). The t-SNE plot 700 demonstrates that the separated sounds are clustered based on object, according to some embodiments. This demonstrates the efficacy of the systems and methods described herein, showing that system 200, system 300, controller 400, etc., accurately separate audio based on visual detection of sound-producing objects.

Referring again to FIGS. 2A-2C, any of system 200, system 300, and/or controller 400 can perform or can be used to perform visually-guided audio denoising. As described in greater detail above with reference to FIG. 2C, controller 400 (or system 200, system 300, etc.) may use an additional scene image to capture or separate ambient/unseen sounds and noises, etc. Given test or training video/audio data with noise, controller 400, system 200, and/or system 300 can use a top visual object detected in the video/audio data (e.g., the visual object associated with the background noise, the ambient noise, etc.) to separate out the ambient noise or the off-screen noise. For example, controller 400, system 200, and/or system 300 may reconstruct or re-combine the real-time audio signals (e.g., as generated by audio converter 418) while excluding the real-time audio signals associated with or separated based on the visual object that corresponds to the background, ambient noise, off-screen noise/sounds, etc.

Configuration of Illustrative Embodiments

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A system for separating audio based on sound producing objects, the system comprising:
   a processor configured to:
      receive video data and audio data;
      perform object detection using the video data to identify a number of sound producing objects in the video data;
      predict a separation for each sound producing object detected in the video data to reduce a consistency loss, wherein the consistency loss quantitatively is related to a reliability of a separation of sounds produced by a corresponding class of the sound producing objects in the video;
      generate separated audio data for each sound producing object using the separation and the audio data.

2. The system of claim 1, wherein the processor is further configured to predict the separation to minimize a co-separation loss.

3. The system of claim 2, wherein the processor is configured to:
   convert the audio data into a magnitude spectrogram;
   predict a spectrogram mask for each sound producing object as the separation;
   generate a separated spectrogram for each detected object using the spectrogram mask and the magnitude spectrogram; and
   convert each of the separated spectrograms to audio data.

4. The system of claim 3, wherein the co-separation loss is a penalty associated with a difference between the predicted spectrogram mask for an associated sound producing object and a ground-truth spectrogram ratio mask.

5. The system of claim 1, wherein the consistency loss quantitatively is defined by the reliability and wherein the separation is predicted to minimize the consistency loss.

6. The system of claim 1, wherein the processor is further configured to use a neural network to predict the separation and generate the separation each detected object, wherein the neural network is trained using a plurality of sets of the video data and the audio data.

7. A method of separating audio data based on sound producing objects in associated video data, the method comprising:
receiving one or more sets of audio data and associated video data;
detecting one or more sound producing objects in the one or more sets of audio data and associated video data;
mixing the audio data of the one or more sets to generate mixed audio data;
using a neural network to predict a separation for each object detected in the one or more sets, wherein the separation reduces a co-separation loss and a consistency loss; and
generating separated audio data for each of the sound producing objects using the separations predicted by the neural network and the mixed audio data.

8. The method of claim 7, comprising:
converting the mixed audio data to a magnitude spectrogram;
using the neural network to predict a spectrogram mask for each object detected in the video data of the one or more sets as the separation;
generating a separated spectrogram for each of the objects detected in the video data of the one or more sets by applying the spectrogram mask of each detected object to the mixed audio data as the separation;
producing a separated audio signal for each of the separated spectrograms.

9. The method of claim 8, wherein the co-separation loss is a penalty associated with a difference between the spectrogram mask for an associated sound producing object and a ground-truth spectrogram ratio mask.

10. The method of claim 9, wherein the ground-truth spectrogram ratio mask is a ratio between:
(1) a magnitude spectrogram of the audio data of one of the one or more sets; and
(2) a sum of magnitude spectrograms of the audio data of the one or more sets.

11. The method of claim 7, wherein the consistency loss is a cross-entropy loss function that defines the consistency loss in terms of a number of sound producing objects, and a plurality of object classes.

12. The method of claim 11, wherein one or more of the plurality of object classes is an audio class for sound that is not produced by the sound-producing objects.

13. The method of claim 7, wherein the predicted separation minimizes a cost function that includes the co-separation loss and the consistency loss, wherein the consistency loss is weighted.

14. The method of claim 7, further comprising:
using the neural network to predict a separation for sound that is not produced by the sound-producing objects.

15. A method for training a neural network to separate audio based on objects present in an associated video, the method comprising:
receiving a plurality of training data, wherein each training data comprises one or more sets of audio data and associated video data:
for each training data:
performing object detection on the video data of the one or more sets to detect one or more sound producing objects of the video data; and
mixing the audio data of the one or more sets to generate mixed audio data; and
training the neural network using the plurality of training data to predict a separation for each sound producing object that reduces a combined loss function, wherein the combined loss function comprises a co-separation loss and a consistency loss.

16. The method of claim 15, wherein the separation is a spectrogram mask and the co-separation loss is a penalty associated with a difference between the spectrogram mask for an associated sound producing object and a ground-truth spectrogram ratio mask.

17. The method of claim 15, wherein the consistency loss is a cross-entropy loss function that defines the consistency loss in terms of a number of sound producing objects and a plurality of classes.

18. The method of claim 15, wherein the combined loss function comprises a weight associated with the consistency loss.

19. The method of claim 18, wherein the weight associated with the consistency loss is adjustable to incentivize the neural network to predict separations associated with lower consistency losses or to predict separations associated with lower co-separation losses.

20. A system for separating audio based on sound producing objects, the system comprising:
a processor configured to:
receive video data and audio data;
perform object detection using the video data to identify a number of sound producing objects in the video data;
predict a separation for each sound producing object detected in the video data to reduce a co-separation loss, wherein the co-separation loss is a penalty associated with a difference between a predicted spectrogram mask for an associated sound producing object and a ground-truth spectrogram ratio mask;
generate separated audio data for each sound producing object using the separation and the audio data.

* * * * *